United States Patent
Brodsky et al.

(10) Patent No.: US 8,311,221 B2
(45) Date of Patent: *Nov. 13, 2012

(54) ARCHITECTURE FOR RECONFIGURABLE QUANTUM KEY DISTRIBUTION NETWORKS BASED ON ENTANGLED PHOTONS DIRECTED BY A WAVELENGTH SELECTIVE SWITCH

(75) Inventors: Mikhail Brodsky, Millburn, NJ (US); Mark David Feuer, Colts Neck, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 12/008,926

(22) Filed: Jan. 15, 2008

(65) Prior Publication Data

US 2009/0180616 A1    Jul. 16, 2009

(51) Int. Cl.
*H04K 1/00* (2006.01)
*H04L 9/08* (2006.01)

(52) U.S. Cl. ....................... 380/256; 380/278
(58) Field of Classification Search .......... 380/263
See application file for complete search history.

(56) References Cited

U.S. PATENT DOCUMENTS

| | | | |
|---|---|---|---|
| 6,263,130 B1 * | 7/2001 | Barnard | 385/24 |
| 2002/0097874 A1 * | 7/2002 | Foden et al. | 380/256 |
| 2003/0156296 A1 * | 8/2003 | Englund et al. | 356/477 |
| 2006/0133807 A1 * | 6/2006 | Jenkins et al. | 398/59 |

OTHER PUBLICATIONS

Runse, R.J.; Toliver, P.; McNown, S.; Chapuran, T.E.; Goodman, M.S.; Jackel, J.; Hughes, R.J.; Nordholt, J.E.; Peterson, C.G.; Tyagi, K.; Hiskett, P.; Optical Fiber Measurements, 2004. Technical Digest: Symposium on ISBN: 1-886843-37-6, Quantum cryptography in optical networks and supporting metrology.*

P. Toliver; R.J. Runser; T.E. Chapuran; J.L. Jackel; T.C. Banwell; Experimental investigation of quantum key distributExperimental investigation of quantum key distribution through transparent optical switch elements, Photonics Technology Letters, IEEE, Issue Date: Nov. 2003,vol. 15 Issue:11, on pp. 1669-1671, ISSN: 1041-1135.*

* cited by examiner

*Primary Examiner* — Philip Chea
*Assistant Examiner* — Fatoumata Traore

(57) ABSTRACT

A system and method for securing communications between a plurality of users communicating over an optical network. The system utilizes a fixed or tunable source optical generator to generate entangled photon pairs, distribute the photons and establish a key exchange between users. The distribution of entangled photon pairs is implemented via at least one wavelength selective switch.

19 Claims, 1 Drawing Sheet

A 1xK wavelength selective switch (WSS) can be used to set up arbitrary simultaneous QKD connections, subject to the limit of total wavelength count.

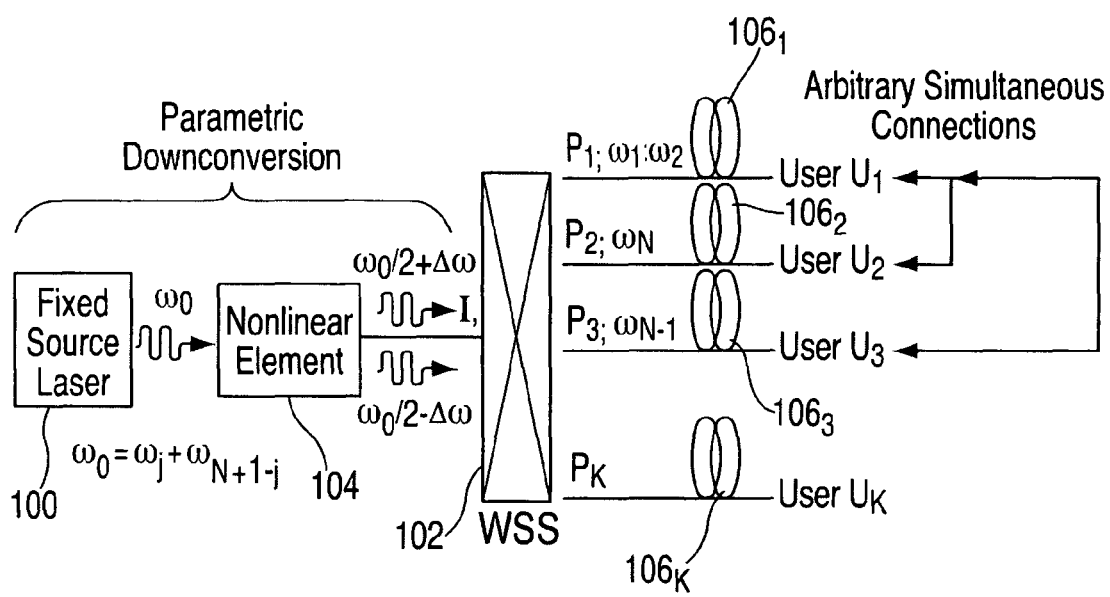
A 1xK wavelength selective switch (WSS) can be used to set up arbitrary simultaneous QKD connections, subject to the limit of total wavelength count.

ARCHITECTURE FOR RECONFIGURABLE QUANTUM KEY DISTRIBUTION NETWORKS BASED ON ENTANGLED PHOTONS DIRECTED BY A WAVELENGTH SELECTIVE SWITCH

FIELD OF THE INVENTION

The present invention relates generally to message security across optical networks through methods of encryption, and more particularly, to an approach for reconfigurable multi-user quantum key distribution (QKD) networks based on the Eckert QKD protocol. Distribution of entangled photons, which controls QKD connections, is determined utilizing a Wavelength Selective Routing Device.

BACKGROUND OF THE INVENTION

Wavelength-division multiplexing (WDM) in optical networking has been employed in core networks for over a decade. WDM technology enables signals of multiple wavelengths to be concurrently transmitted over a given optical medium. This has been facilitated by the availability of wideband optical amplifiers that can simultaneously amplify many different wavelengths without distortion. The advantages provided by WDM translate into greater fiber utilization, lower capital expenditures associated with fiber deployment, and reduced costs in repeater stations by eliminating the need to terminate each wavelength along the fiber path. To maximize economic utility, the wavelength density that can be multiplexed onto a given fiber has increased in recent years: 80-wavelength systems are now common in the EDFA band, with 50 GHz frequency spacings between channels in many offerings.

Tunable unidirectional wavelength multiplexers and demultiplexers for adding and dropping a wavelength channel to and from a transmission system with a node are known in the art. It is also known that these tunable multiplexers may comprise wavelength-selective switches (WSSs) on the multiplexer side to multiplex a plurality of wavelength channels that are being added to the optical transmission system. Tunable filters or an additional WSS can be utilized to demultiplex wavelength channels that are dropped from the optical transmission system to the local terminal. WSSs are commercially available devices that dynamically route signals from the input port(s) to the output port(s) based on the wavelength of the signal, in response to control signals that set the WSS's connection state. In unidirectional multiplexers and demultiplexers, separate optical components are used to multiplex and demultiplex the signals.

Quantum Key Distribution and Networking-Message security is a critical concern in today's communication networks. Such security is usually provided through cryptography, a process in which message data is convolved with a known key to produce an encrypted message. The level of security varies with the algorithm and the key length, but security can always be improved by changing keys more frequently. In fact, the only provably secure encryption is the one-time pad, in which there is one key bit per message bit, and keys are never reused. For any encryption method, the security of the message is based on the privacy of the keys. Even the one-time pad can be broken if the keys are known to an eavesdropper. Thus, secure key distribution is the foundation of any encryption system. The classic method of key distribution is to generate keys at one site, record them on a physical medium, then transfer them via human courier to both ends of an encrypted message link. Quantum Key Distribution (QKD) removes the risks associated with courier distribution, enabling collaborative generation of secure keys at the endpoints where they are needed. Security of the process against eavesdropping is guaranteed by the no-cloning theorem, when operating in the single-quantum regime. Classic QKD algorithms, such as the BB84 protocol (Bennett and Brassard, 1984) are designed for point-to-point operation between two sites connected by a dedicated optical link. For a community of K users interconnected by optical fibers, K*(K−1) fiber pairs would be needed. Our new approaches offer a much more efficient, fiber-lean, solution for full connectivity. They also provide for dynamic sharing of the QKD bandwidth, allowing rapid expansion or contraction of the QKD rate at individual sites on an on-demand basis.

Quantum Entanglement—Quantum entanglement is a phenomenon relating the quantum states of two or more objects even when these objects are spatially separated. This phenomenon manifests itself in correlation between measurable physical properties of the entangled objects. The simplest example is a pair of polarization-entangled photons. A photon can have either vertical or horizontal polarization. For two entangled photons the polarization of each is uncertain. However, when these photons are sent to distant observers Alice and Bob, polarization measurements performed by them are correlated. That is if Alice observes a vertical polarization for her photon, Bob's photon will have a horizontal polarization or vice versa. While Alice's result is random (she does not know a priori whether her photon is horizontally or vertically polarized), polarization measurements performed by Bob always produce a result correlated with that of Alice. If a sequential stream of entangled photons is delivered to Alice and Bob, such correlation allows them to form a truly random sequence of zeros and ones that could serve as a cryptographic key for secured communication (Eckert 1991). To maximize the generation rate of secure keys, exchange of measurement data between Alice and Bob is typically performed through a classical communication channel, which may be public. The QKD protocols are constructed in such a way that an eavesdropper on the public channel cannot reconstruct the secure keys. Thus, the quantum part of an entanglement-based QKD system may be made up of unidirectional fibers and components that distribute entangled photons. The (bidirectional) classical channel needed to complete the QKD system can be provided by any of the standard systems known in the art, and it is not discussed below.

Creation of the entangled photons for telecom applications—The entangled photon pairs may be created by one of a variety of processes in which a photon from a source laser interacts with a nonlinear medium (which could be a special fiber or a waveguide structure), such as the parametric down-conversion (PDC) process. In this PDC process, a primary source photon with a frequency $\omega_0$ is annihilated in this process and a pair of entangled photons with frequencies $\omega_1$ and $\omega_2$ is created. In fact, each of the entangled photons occupies a relatively broad optical spectrum of the width BPDC centered at $\omega_1$ and $\omega_2$. Conservation of energy requires that the sum of the $\omega_1$ and $\omega_2$ is equal to $\omega_0$. BPDC could be up to few tens of nm wide (20-40 nm). Such a spectral width makes the photons unsuitable for communication through optical fibers due to deleterious effects of chromatic dispersion. Thus, the photons are filtered, which reduces their bandwidth to about BF~1 nm (or 125 GHz). To preserve the entanglement, the filters' center frequencies $\omega_{F1}$ and $\omega_{F2}$ must add up to $\omega_0$. That is, the entangled photons are equally spaced above and below the frequency of the primary source photon. One way to provide the needed filtering is the use of a wavelength demultiplexer (WDM). An entangled pair enters the WDM through a common port, one photon leaves through a port A (centered around $\omega_A$) to a fiber leading to Alice, and, in a similar fashion, the second photon is directed to Bob through port B (centered around $\omega_B$), where $\omega_A+\omega_B=\omega_0$. If another nonlinear process is used instead of PDC, the mathematical relation between the primary source frequency and the frequencies of the entangled photons may differ from that specified above, but a known mathematical relation will exist and the present invention can be used to establish QKD connection topology.

SUMMARY OF THE INVENTION

In accordance with a first aspect of the invention, there is disclosed a methodology for securing communications between a plurality of users communicating over an optical network. The method generally comprises the steps of: generating entangled photon pairs with known frequency relationships, distributing entangled photon pairs among individual users via a reconfigurable wavelength routing device, and establishing a key exchange between the individual users using the entangled photons distributed to the individual users.

In accordance with another aspect of the invention, there is disclosed a system for securing communications between a plurality of users communicating over an optical network. The inventive system comprises: a source adapted for generating entangled photon pairs with known frequency relationships, and a reconfigurable wavelength routing device communicating with the optical source for establishing a key exchange between the individual users using entangled photon pairs.

In accordance with yet another aspect of the invention, there is disclosed a memory medium containing machine readable instructions which, when executed by a processor, enable a device to secure communications between a plurality of users communicating over an optical network by generating entangled photon pairs at a plurality of frequencies from a primary optical source, distributing the entangled photons pairs to the users via a reconfigurable wavelength routing device, according to the frequency of the entangled photons; and establishing a key exchange between users using the entangled photon pairs.

These aspects of the invention and further advantages thereof will become apparent to those skilled in the art as the present invention is described with particular reference to the accompanying drawings.

BRIEF DESCRIPTION OF THE DRAWINGS

FIG. 1 is a schematic of an illustrative embodiment in accordance with an aspect of the present invention, depicting a network architecture wherein communications between users on a WSS network are secured via a Quantum Key Distribution using a fixed laser source.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Referring to FIG. 1 there is depicted an embodiment of the invention which utilizes a fixed source laser (also known as a fixed pump laser) 100 in combination with a Wave Selective Switch (WSS) 102, the WSS comprising a single port ($I_1$) disposed on one side of the WSS 102 and a multiplicity (K) of ports ($P_1, P_2, \ldots P_K$) on the opposite side of the WSS 102. In this expedient, the WSS 102 divides a broadband input signal into N frequency bands (typically about 100 GHz in width), each centered at a frequency $\omega_i$, and routes the individual demultiplexed signals to output ports $P_1, P_2, \ldots P_K$. These individual bands are commonly referred to as "channels". It will be appreciated by those skilled in the art that the WSS 102 is operable to route a signal from any input port to any output port. A given output port may simultaneously carry multiple channels, up to and including a full spectrum of channels carried on a broadband signal input to the WSS 102. It will be further appreciated that a WSS 102 may provide additional capabilities, such as multicasting operations. In this regard, a signal from a given input channel can be distributed among multiple output ports. Thus, the WSS 102 depicted in FIG. 1 can be employed to deliver entangled photon pairs to a plurality of users. In the example shown and described herein, K users $U_1 \ldots U_K$ are individually coupled by optical fibers $106_1$-$106_K$ to output ports $P_1$-$P_K$ of WSS 102. In this case, the source laser frequency is set to the middle of the WSS 102 band: $\omega_0=\omega_1+\omega_N$. In order to deliver the entangled photon pairs to any pair of users $\{U_i, U_j\}$, complementary frequency channels m and n ($\omega_0=\omega_m+\omega_n$) may be routed to ports $P_i$ and $P_j$, respectively. It will be appreciated by those of ordinary skill, that full connectivity can be achieved with a minimal number of fibers (i.e., K fibers for K endpoints). This has the potential to confer a dramatic improvement in network scalability as compared to the conventional fixed, point-to-point arrangement discussed in the foregoing. The WSS 102 further permits various combinations of connections to be concurrently set up and established. For example, channels $\omega_1$ and $\omega_2$ can be routed to $U_1$, while channel $\omega_N$ is routed to $U_2$ and $\omega_{N-1}$ is routed to $U_3$, where $\omega_0=\omega_1+\omega_N$ and $\omega_0=\omega_2+\omega_{N-1}$. In this manner, the following pairs of users $\{U_1, U_2\}$ and $\{U_1, U_3\}$ will receive the entangled pairs. It is unnecessary for each pair of users to obtain an entangled pair in each clock cycle, thus only each QKD connection requires an adequate supply of entangled photon pairs. It is also possible to set up multiple connections between a given pair of endpoints if their demand for QKD bandwidth is greater than the demand that can be supported by a single channel. In fact, due to its non-blocking switch capability, the WSS can distribute the available QKD channels in any arbitrary pattern that may be desired, and reconfigure them as needed. If there is a need to support more than K end users, WSS units may be cascaded to provide as many output ports as desired. In particular, the network may support more endpoints than there are wavelength channels (K>N), simply by scheduling the connection times and durations.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A method comprising:
   generating entangled photon pairs with known frequency relationships, wherein each of the entangled photon pairs is centered at an optical source frequency;
   concurrently distributing the entangled photon pairs among pairs of a plurality of users communicating over an optical network via a reconfigurable wavelength routing device based on shared optical source frequencies among the entangled photon pairs and scheduled connection and duration times; and
   establishing a key exchange between the plurality of users.

2. The method recited in claim 1, in which distributing the entangled photon pairs among the plurality of users is accomplished via ports of a wavelength selective switch.

3. The method recited in claim 1, further comprising segregating a broadband stream of entangled photon pairs into individual wavebands at a plurality of ports serving each of the plurality of users respectively.

4. The method recited in claim 3, further comprising concurrently communicating with a waveband at each of the plurality of ports.

5. The method recited in claim 1, further comprising concurrently establishing a plurality of key exchange connections between a selected pair of the plurality of users.

6. The method recited in claim 1, further comprising reconfiguring the wavelength routing device to establish a new key exchange connection among the plurality of users.

7. The method recited in claim 1, further comprising reconfiguring the wavelength routing device to terminate a key exchange connection among the plurality of users.

8. The method recited in claim 1, in which generating entangled photon pairs is accomplished by parametric down-conversion.

9. The method recited in claim 1, in which generating entangled photon pairs is accomplished by degenerate four-wave mixing.

10. A system comprising:
    an optical source adapted to generate entangled photon pairs with known frequency relationships, wherein each of the entangled photon pairs is centered at a source frequency; and
    a reconfigurable wavelength routing device adapted to communicate with the optical source to:
       concurrently distribute the entangled photon pairs among pairs of a plurality of users communicating over an optical network based on shared source frequencies among the entangled photon pairs and scheduled connection and duration times; and
       establish a key exchange between the plurality of users.

11. The system recited in claim 10, wherein the optical source is adapted to produce entangled photon pairs whose frequencies obey a known mathematical relation.

12. The system recited in claim 10, wherein the reconfigurable wavelength routing device is adapted to selectively distribute the entangled photon pairs among a plurality of output ports according to a frequency of the entangled photon pairs.

13. The system recited in claim 12, wherein the reconfigurable wavelength routing device is adapted to selectively distribute entangled photon pairs at a plurality of distinct frequencies to a single output port.

14. The system recited in claim 12, wherein the reconfigurable wavelength routing device is adapted to selectively multicast entangled photon pairs at a given frequency to a plurality of output ports.

15. The system recited in claim 12, wherein the reconfigurable wavelength routing device comprises a wavelength selective switch, adapted to selectively communicate signals between ports of the wavelength selective switch to the plurality of users individually.

16. The system recited in claim 10, wherein the reconfigurable wavelength routing device is adapted to establish a plurality of concurrent key exchanges between users among the plurality of users.

17. A memory containing machine readable instructions which, when executed by a processor, enable a device to secure communications between a plurality of users communicating over an optical network by:
    generating entangled photon pairs with known frequency relationships, wherein each of the entangled photon pairs is centered at an optical source frequency;
    concurrently distributing the entangled photon pairs among pairs of a plurality of users communicating over an optical network via a reconfigurable wavelength routing device based on shared optical source frequencies among the entangled photon pairs and scheduled connection and duration times; and
    establishing a key exchange between the plurality of users.

18. The memory recited in claim 17, wherein the reconfigurable wavelength routing device is a wavelength selective switch.

19. The memory recited in claim 17, wherein the reconfigurable wavelength routing device is reconfigured according to the machine-readable instructions to establish a new key exchange connection among the plurality of users.

* * * * *